United States Patent [19]

Holik et al.

[11] Patent Number: 4,570,314
[45] Date of Patent: Feb. 18, 1986

[54] PRESS ROLL

[75] Inventors: Herbert Holik, Ravensburg; Helmut Hund, Vorberg; Peter Mirsberger, Weingarten, all of Fed. Rep. of Germany

[73] Assignee: Escher Wyss Aktiengesellschaft, Zürich, Switzerland

[21] Appl. No.: 385,252

[22] Filed: Jun. 4, 1982

[30] Foreign Application Priority Data

Jun. 24, 1981 [CH] Switzerland ............... 4172/81
Jun. 30, 1981 [CH] Switzerland ............... 4285/81

[51] Int. Cl.⁴ .............................. B21B 31/32
[52] U.S. Cl. ............... 29/113 R; 29/116 R; 100/93 RP; 100/162 B
[58] Field of Search ...... 29/116 AD, 113 AD, 116 R, 29/110, 113 R; 100/162 B, 93 RP

[56] References Cited

U.S. PATENT DOCUMENTS

| | | | |
|---|---|---|---|
| 3,657,782 | 4/1972 | Mott | 29/116 R X |
| 3,804,707 | 4/1974 | Mohr et al. | 29/113 AD |
| 4,030,177 | 6/1977 | Hold | 29/116 AD |
| 4,106,407 | 4/1978 | Mitter | 29/116 R X |
| 4,228,571 | 10/1980 | Biondetti | 29/116 AD |
| 4,249,290 | 2/1981 | Lehmann | 29/116 AD |
| 4,287,021 | 9/1981 | Justus et al. | 100/93 RP |

*Primary Examiner*—Howard N. Goldberg
*Assistant Examiner*—John T. Burtch
*Attorney, Agent, or Firm*—Werner W. Kleeman

[57] ABSTRACT

A press roll contains a stationary roll support or beam and a roll shell rotatable about the stationary roll support, the roll shell being formed of an easily deformable material. The roll shell is supported at a support surface located at the region of the roll support. This support surface can be convex and possess a larger radius than the radius of the roll shell, can be planar or concave. Guide surfaces possessing a convex profile laterally merge at the support surface. The support surface and the guide surfaces are provided with a pressure lubrication and possibly with hydrostatic bearing pockets. A support part or element can be movable in relation to the stationary roll support or beam in the manner of controlled deflection rolls.

17 Claims, 10 Drawing Figures

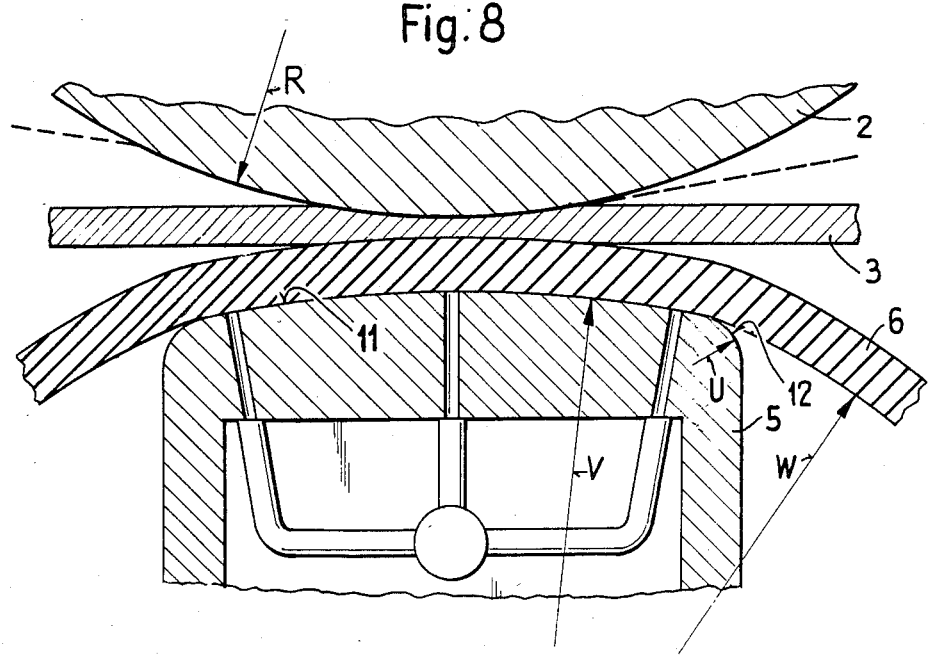
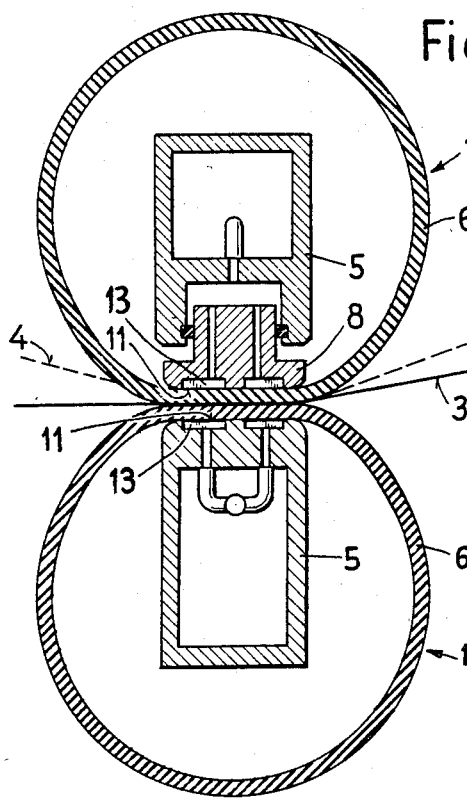
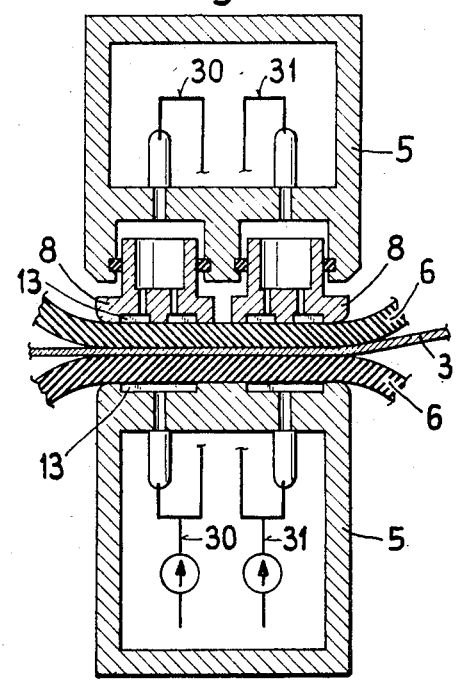

PRESS ROLL

BACKGROUND OF THE INVENTION

The present invention relates to a new and improved construction of a press roll.

Generally speaking, the press roll of the present development is of the type containing a stationary roll support or beam and a roll shell mounted to be rotatable about the stationary roll support. The roll shell is formed of an easily deformable material. The roll shell is supported at the roll support or beam upon a support surface at the region of the pressing or contact location. The roll shell moves at its inner or interior surface along the support surface.

Press rolls of this type are known to the art, for instance from U.S. Pat. No. Re. 26,219, U.S. Pat. No. 3,276,102, and U.S. Pat. No. 3,802,044, granted Apr. 9, 1974. Such rolls can be provided with resilient or yieldable, easily deformable roll shells, such as are known, for instance, from U.S. Pat. No. 4,069,569, granted Jan. 24, 1978.

In all of these instances the support surfaces, upon which slides the roll shell by means of its inner or interior surface, can be configured to be convex and possess a radius which essentially is equal to the radius of the inner surface of the roll shell. When coacting with a counter roll this results in there being formed between both rolls an essentially linear pressing location having an extremely small expanse in the circumferential direction of the roll shell. As a result, the material of the yieldable or resilient roll shell, as a general rule an elastomeric material, is intensively deformed at the narrowest location of the pressing nip or gap, and specifically to an increasingly greater extent the wider should be the pressing surface. This results in a pronounced wear of the deformable roll shell.

SUMMARY OF THE INVENTION

Therefore, with the foregoing in mind it is a primary object of the present invention to provide a new and improved construction of a press roll which is not afflicted with the aforementioned drawbacks and limitations of the prior art constructions.

Another and more specific object of the present invention aims at the provision of a new and improved construction of a press roll of the previously mentioned type, wherein there can be obtained an appreciably wider pressing surface between the roll and a counter roll, but with simultaneous protection of the roll shell.

Now in order to implement these and still further objects of the invention, which will become more readily apparent as the description proceeds, the press roll of the present development is manifested by the features that, the support surface possesses a configuration or form, at least over a portion of its extent in the circumferential direction of the roll shell, which deviates from a circular cylindrical shape of the inner surface of the roll shell, and specifically deviates in a manner promoting an accommodation to a counter surface intended to coact with the press roll.

By virtue of the inventive measures it is possible for the roll shell to be able to snugly bear against the counter roll along a greater length of its circumference, so that there can be obtained an appreciably wider pressing location or region between both rolls, the width of which amounts to a multiple of the previous widths of the pressing nip or gap possible between two rolls designed according to the prior art.

According to one possible construction of the press roll as contemplated by the invention, the support surface can possess a convex shape or configuration at least over a portion of its course or extent in the circumferential direction of the roll shell. This convex shape possesses a larger radius than would correspond to the cylindrical shape of the inner surface of the roll shell. Hence, in a relatively simple manner and with relatively rigid roll shells there is already obtained a decisive enlargement or widening of the pressing location or region between the press roll and the counter roll.

However, the support surface also can be flat or planar at least over a portion of its course or extent. Such type of construction of rolls are particularly of advantage in those situations where two essentially identical rolls press against one another at their flat or planar surfaces.

However, the support surface also can be constructed to be concave in the circumferential direction of the roll shell and possess a shape which is accommodated to the radius of the counter roll coacting with the press roll as well as to the thickness of the pressed web material located between the counter roll and the support surface and the roll shell. Also, by virtue of these measures there can be obtained a particularly wide or expansive pressing location or region, and specifically in conjunction with a conventional counter roll having a cylindrical outer surface. The material of the roll shell is deformed less by the pressure at the pressing location or region, rather is primarily bent, constituting a favorable load condition for the elastomeric or rubber like material of the roll shell.

The concave support surface can have correlated thereto at least at one side thereof a guide surface possessing a convex profile or configuration. This guide surface enables a faultless insertion or introduction of the roll shell into the pressure region of the support surface, especially if the roll shell, during the start of the operation, should hang slack and should not have its round cylindrical configuration.

The support surface and/or the guide surface can be provided with a pressure lubrication. Although in principle it would be possible to also have a lubrication of the support surface and the guide surface, respectively, by means of a liquid medium located in the roll shell, by virtue of the pressure lubrication there is afforded a faultless infeed of lubricant to the running or travel surface.

Preferably, the support surface and/or the guide surface can be equipped with hydrostatic bearing pockets for a hydrostatic lubricant. Consequently, there is obtained a particularly advantageous design of the inventive roll, by means of which there can be extensively avoided mechanical contact of the inner surface of the roll shell with the support surface.

According to an extremely simple constructional manifestation of the invention the support surface can be formed at the roll support or beam. In this case the support surface is formed at a wall of the roll support.

However, the support surface can be preferably formed at least at one support part or element which is supported upon the roll support or beam by means of a hydrostatic support arrangement in the manner of a piston-and-cylinder unit or device. Such type of hydrostatic support arrangements, which serve for the compensation of bending or sag, are known to the art from the aforementioned U.S. Pat. No. Re. 26,219, U.S. Pat. No. 3,276,102, and U.S. Pat. No. 3,802,044.

With this embodiment hydrostatic bearing pockets can be connected with the pressure chamber of the hydrostatic support arrangement by means of throttle bores. Such constitutes a construction as the same is known from the aforementioned U.S. Pat. No. 3,802,044. In equally known fashion and as disclosed in this patent there can be provided either an elongate or extended support ledge, rows of individual pistons, or punch-like support or pressure elements.

The inner chamber of the roll shell can be sealed essentially in a gas tight fashion and can be connected with an infeed line for compressed or pressurized air. In this case, by the action of the internal excess or gauge pressure a thin roll shell, which in the standstill condition of the equipment hangs slack, can be brought into a substantially cylindrical configuration for the purpose of facilitating the start-up of the equipment. However, it is to be understood that for this purpose there can be provided different facilities within the roll shell.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 8 is an illustration, corresponding to the showing of FIG. 2, of the pressure region of a roll having a convex support surface and cylindrical counter roll;

FIG. 9 illustrates two press rolls having essentially planar or flat support surfaces; and FIG. 10 illustrates rolls each having two rows of support or pressure elements.

DETAILED DESCRIPTION OF THE PREFERRED EMBODIMENTS

Figure 1:
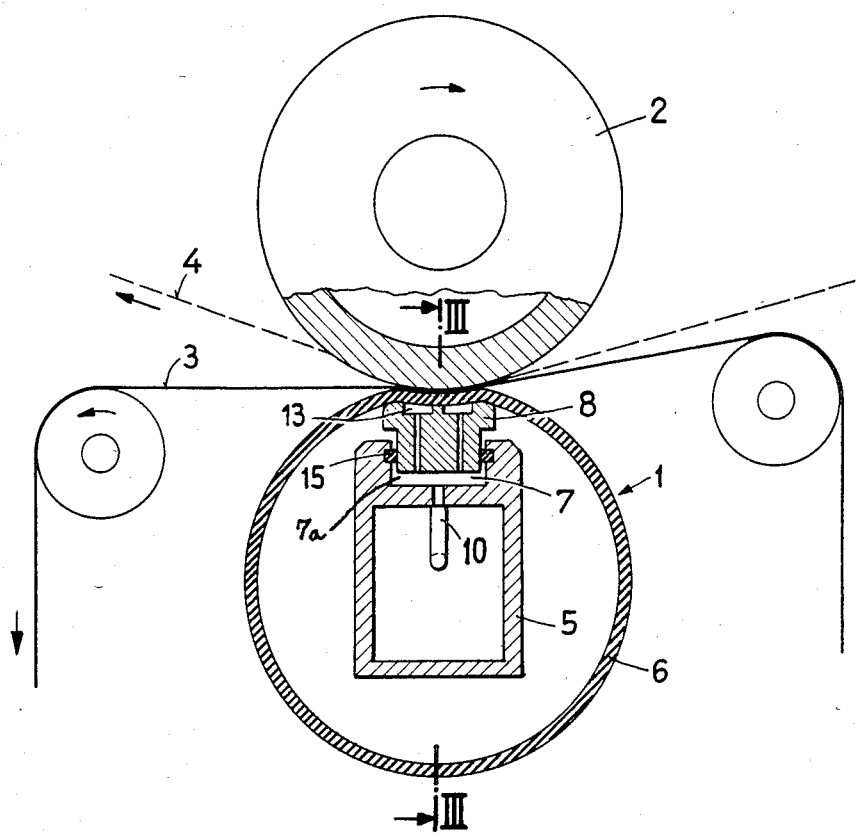
FIG. 1 is a schematic sectional view of an inventive press roll arranged in a press for dewatering paper webs.

Describing now the drawings, in FIG. 1 there is depicted an exemplary embodiment of press roll constructed according to the invention, which is installed in a rolling mill or press for dewatering a paper web. The inventive press roll 1 coacts with a counter roll 2. Between both of the rolls 1 and 2 there passes, for instance, a felt web 3 and the paper web 4 which is to be pressed. Such type of rolling mill or press equipped with conventional rolls is well known to the art.

The inventive construction of press roll 1 contains a stationary or fixed roll support or beam 5 about which there is rotatably mounted a roll shell 6. This roll shell 6 consists of an easily deformable material, for instance an elastomeric or rubber-like material or a plastics material.

With the exemplary embodiment depicted in FIG. 1, the fixed roll support or beam 5 is equipped with an elongated groove or channel 7 within which there is sealingly guided a substantially ledge-shaped support part or element 8. This groove or channel 7, which simultaneously forms a pressure chamber 7a, is flow connected by means of a pipe line or conduit 10 with a suitable source of a hydraulic pressurized fluid medium, typically for instance oil or water.

Figure 2:
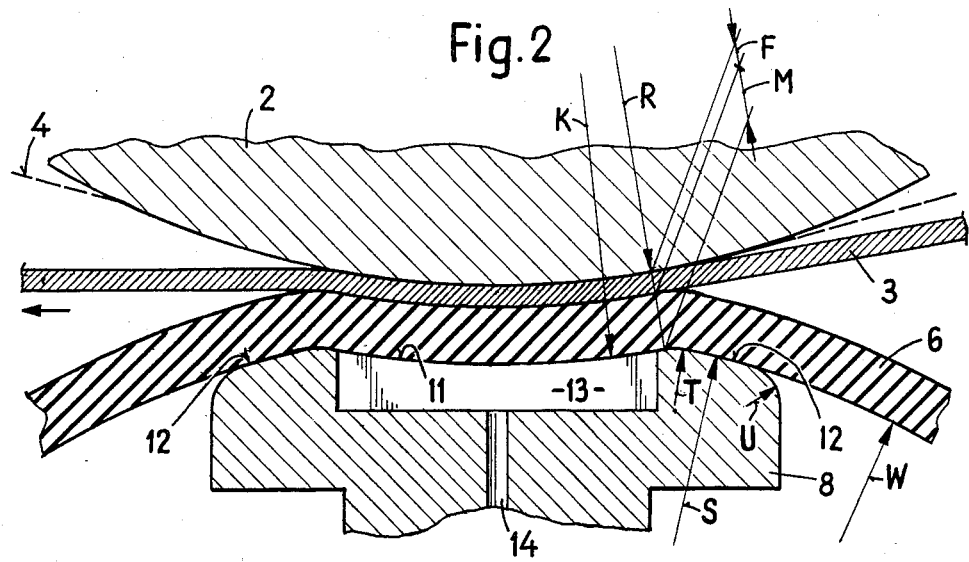
FIG. 2 is an enlarged detail showing of a portion of the arrangement of FIG. 1.

FIG. 2 illustrates on an enlarged scale the conditions prevailing in the pressure region or zone between both of the rolls 1 and 2. In accordance with the showing of FIG. 2, the support part or element 8 has a concave support surface 11, the radius K of which essentially is of the same magnitude as the sum of the radius R of the counter roll 2, the thickness F of the felt band 3 and the thickness M of the roll shell 6.

At both sides of the support part or element 8, viewed in the circumferential direction of the roll 1, there merge with the concave support surface 11 convex guide surfaces 12. These convex guide surfaces 12 facilitate the entry or introduction of the roll shell 6, during its rotational movement, into the pressure region or zone between the support surface 11 and the counter roll 2.

Figure 4:
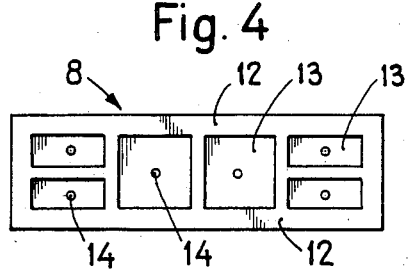
FIG. 4 is a top plan view of a substantially ledge-shaped support element of the arrangement of FIG. 1.

As will be apparent by again reverting to FIGS. 1 and 2 and also FIG. 4, the support surface 11 of the support part or element 8 is provided with hydrostatic bearing pockets 13 for a hydrostatic lubricant. The hydrostatic bearing pockets 13 are connected by throttle bores 14 or equivalent structure with the pressure chamber or compartment 7a in the roll support or beam 5. By virtue of such type of construction of the support part or element 8 there is obtained, apart from a bending or sag compensation, an essentially constant hydrostatic lubricant nip or gap between the support surface 11 and the inner or interior surface of the roll shell 6. The operation of such type of apparatus has been described in detail in the aforementioned U.S. Pat. No. 3,802,044 from which further details can be readily obtained. By virtue of the fact that there are provided in the circumferential direction of the roll 1 adjacently arranged bearing pockets 13, which are connected independently of one another by bores 14 or equivalent passages with the pressure chamber or compartment 7a, there is obtained, just as was the case for the roll described in the aforementioned U.S. Pat. No. 3,802,044, a stabilization of the support part or element 8 at the roll shell 6, and thus, at the counter roll 2. For this purpose, and as will be apparent by inspecting FIG. 1, the support part or element 8 is inclinable in the channel or groove 7 forming the pressure chamber 7a, and guided with a relatively large amount of play in relation to the wall of such channel or groove 7 in a suitable seal or seal arrangement 15.

Figure 3:
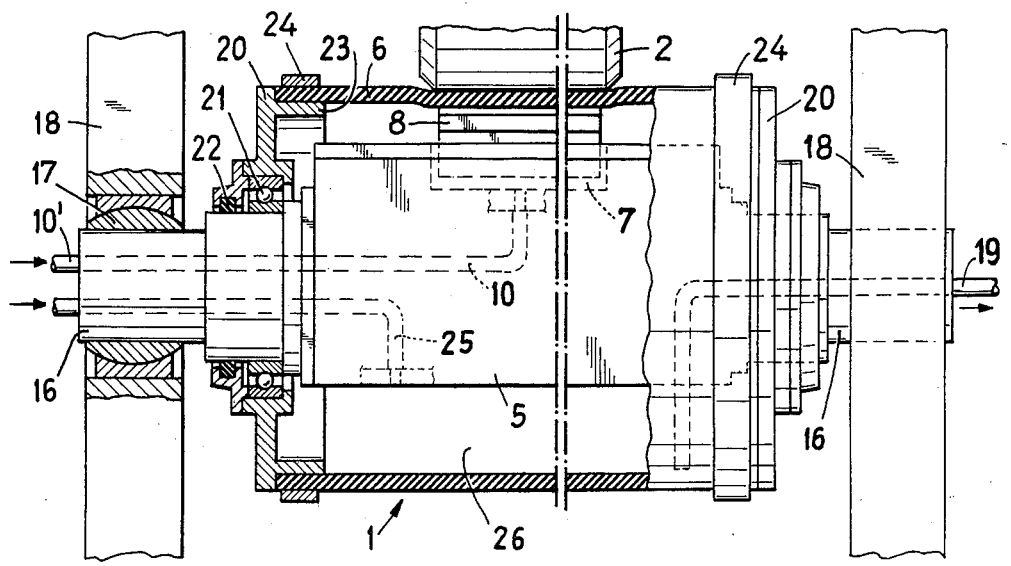
FIG. 3 is a fragmentary sectional view of the arrangement of FIG. 1, taken substantially along the section line III—III thereof.

FIG. 3 illustrates a partially sectional view of the arrangement of FIG. 1, taken substantially along the section line III—III thereof. As will be apparent by inspecting FIG. 3, the roll support or beam 5 is provided at both of its opposed ends with journals 16 which, for instance, can be attached at a roll stand or framework 18 by means of spherical bearings 17 or equivalent structure. Rotatably mounted at the journals 16 with the aid of roller or ball bearings 21 and seals 22 are the cover members or closures 20. The cover members or closures 20 are provided with substantially cylindrical flanges 23 at which there are secured the ends of the roll shell 6 by suitable attachment bands 24. As also will be recognized by further referring to FIG. 3, at least one of the journals 16 is provided with a connection 10' for the pipe line or conduit 10 for infeeding the hydraulic pressurized fluid medium as well as with a line or conduit 25 which opens into the intermediate space or chamber 26 between the roll support or beam 5 and the roll shell 6. The line or conduit 25 serves for the infeed of compressed or pressurized air at a suitable pressure into this intermediate chamber or space 26, so that the roll shell 6 can be expanded, in order to impart thereto a substantially cylindrical configuration. This cylindrical configuration is primarily advantageous for the start of the operation of the press roll. During operation, the cylindrical shape is obtained by the action of the centrifugal force with appropriate rotational speed of the roll shell 6.

As will be recognized by again reverting to FIG. 2, the guide surfaces 12 of the support element 8 contain three sections or portions having the radii S, T and U. The largest of the radii, the radius S, is essentially of the same magnitude as the radius W of the cylindrical shape of the roll shell 6. On the other hand, the radii T and U are smaller.

FIG. 4 illustrates essentially a plan view of the support part or element 8 containing the hydrostatic bearing pockets 13. It will be recognized that at the ends of the substantially ledge-shaped support element 8 there are arranged in circumferential direction two respective pockets 13, whereas a row of individual pockets extends between these dual terminal or end pockets 13.

Figure 5:
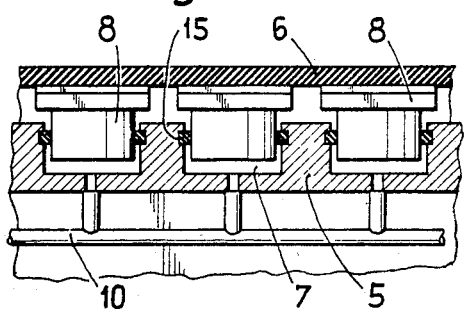
FIG. 5 is a fragmentary view of the arrangement of FIG. 3, wherein the support ledge is here replaced by a row of piston-like support or pressure elements.

In FIG. 5 there has been illustrated a somewhat modified construction of the roll depicted in FIGS. 1 to 3. According to the showing of FIG. 5 the elongate, substantially ledge-shaped support part or element 8 of the arrangement of FIG. 4 is here replaced by a row of piston-like support or pressure elements 8 which are guided in substantially cylindrical bores or channels 7.

Figure 6:
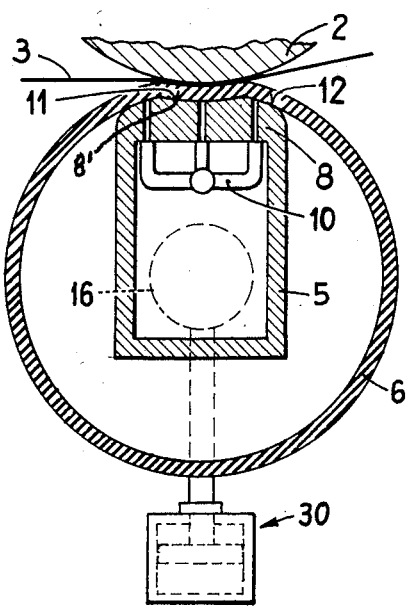
FIG. 6 is an illustration, corresponding to the sectional view of FIG. 1, but depicting a different construction of roll.

FIG. 6 depicts a sectional view, corresponding to the showing of FIG. 1, of a particularly simple construction of the inventive press roll. With the roll portrayed in FIG. 6 the support part or element 8 together with the roll support 5 is formed of one-piece or integrally. In the present case under discussion this means that the support surface 11 together with the guide surfaces 12 are formed at a wall 8' of the substantially box-shaped roll support 5. In this case, the pipe conduit or line 10 serves for the infeed of liquid lubricant in the manner of a pressurized lubricant, a particular case of which is constituted by the hydrostatic bearing arrangement described previously in conjunction with FIG. 2.

Since with the embodiment of FIG. 6 the support surface 11 is not movable in relation to the roll support or beam 5 for the formation of contact or pressing movements and for the compensation of a deflection or sag of the roll support or beam 5, this roll support 5 together with the roll shell 6 can be pressed as a unit, by a suitable pressing or contact mechanism 30, against the counter roll 2. However, it should be understood that the roll support or beam 5, in the manner according to the showing of FIG. 3, can be fixedly supported and the counter roll 2 can be pressed against the roll 1.

As already explained, with the inventive roll there are provided different possibilities for the arrangement and the lubrication of the lateral guide surfaces containing a convex profile or configuration.

In accordance with the illustration of FIG. 2, the guide surfaces 12 are laterally formed at the same support part or element 8 as the support surface 11. With the embodiment of FIG. 2 only the support surface 11, which carries the pressure load, is provided with hydrostatic lubrication by means of the bearing pockets 13 and the throttle channels 14. The guide surfaces 12 are only lubricated by the pressurized medium flowing out of the bearing pockets 13 and the lubricant film or liquid adhering to the inner surface of the roll shell 6, respectively.

Figure 7:
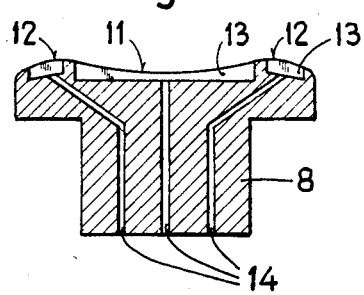
FIG. 7 is an illustration, corresponding to the showing of FIG. 2, depicting details of a support part or element having a support surface and guide surfaces with hydrostatic bearing pockets.

With the arrangement of FIG. 7 there are formed hydrostatic bearing pockets 13 also in the guide surfaces 12. Here, the lateral stabilization of the support part or element 8 can be accomplished by the bearing pockets 13 of the guide surfaces 12.

FIG. 8, which essentially corresponds to a section of the arrangement of FIG. 6, depicts a modified construction of roll wherein the support surface 11 is not concave, rather configured to be convex, and specifically, to have a radius V which is larger than the radius W of the inner surface of the roll shell 6.

Finally, FIG. 9 illustrates two coacting inventive rolls 1, of which the lower roll has been constructed essentially in accordance with the showing of FIG. 6, the upper roll in accordance with the showing of FIG. 1. Both coacting rolls here have substantially flat or planar support surfaces 11.

Suitable as the pressurized fluid medium and the lubricant for the inventive constructions of rolls is either an oil, which is compatible with the material of the roll shell, or a different liquid, such as for instance water. The removal of excess oil or excess liquid out of the roll shell is accomplished by the schematically illustrated removal or withdrawal line 19, as best seen by referring to FIG. 3. This withdrawal line 19 can be equipped with a not particularly illustrated flow control device, for instance a suitable shutoff element, a float valve or simply a throttle location, which is capable of preventing excessive escape of air which is at an excess pressure out of the roll shell in the event there is contemplated the infeed of such type of air. On the other hand, an excess pressure within the roll shell can augment outflow of the liquid.

Although, as explained, the roll shell 6 according to the illustration of FIG. 3 is attached to a part or element 20 which is rotatably arranged at the roll support or beam 5, it is possible to provide a design wherein the roll shell 6 is movable towards the counter roll 2 or away from the latter. Such type of mounted and guided roll shells are known to the art, for instance, from the previously mentioned U.S. Pat. No. 3,885,283.

In the case of the support surfaces 11 equipped with the hydrostatic bearing pockets 13 these bearing pockets form a part of such support surface. Their shape is thus determined by the webs which surround and delimit the bearing pockets. At this location there is formed, during operation, the lubricant film with a desired film thickness between the web and the inner surface of the roll shell. Within the bearing pockets there is effective the pressurized fluid medium with its pressure upon the inner surface of the roll shell.

With the convex form of the support surface its radius is larger than the radius of the inner surface of the roll shell 6, wherein, however, the center of the radius is located at the same side of the support surface as the center of the radius of the cylindrical shape of the roll shell. In the case of the flat or planar support surface the center of the radius is located at infinity. With a concave shape of the support surface the radius becomes so-to-speak "negative" since the center of the shape of the support surface is located at the side of the roll shell remote from the center of the roll cross-section.

It is also possible to provide two or more rows of support parts or elements, which, or instance, can be constructed so as to have a substantially ledge-shaped or punch-shaped configuration. Such type of construction has been illustrated in FIG. 10 which otherwise corresponds to a section of the arrangement of FIG. 9 on an enlarged scale. According to this FIG. 10 the support parts or elements 8 of each row together with the hydrostatic bearing pockets 13, which coact therewith, are connected in each instance to a special feed or supply line or conduit 30, 31 for the pressurized fluid medium. The lines 30 and 31 can be supplied with different pressures, so that there prevails between the support parts or elements 8 different pressure forces. It should be understood that such measures also can be used in the case of rolls of the type disclosed heretofore with reference to FIGS. 1 to 5.

While there are shown and described present preferred embodiments of the invention, it is to be distinctly understood that the invention is not limited thereto, but may be otherwise variously embodied and practiced within the scope of the following claims. ACCORDINGLY,

What we claim is:

1. A press roll for forming an extended nip comprising:
   a stationary roll support;
   a roll shell counted to be rotatable about said stationary roll support;
   said roll shell being formed of an easily deformable material;
   a support surface at which there is supported the roll shell at the roll support at the region of a pressing location;
   said roll shell having an inner surface of substantially circular cylindrical shape;
   said roll shell moving at its inner surface along said support surface;
   said support surface possessing at least at a portion of its extent in the circumferential direction of the roll shell a shape which deviates from said substantially circular cylindrical shape of the inner surface of the roll shell in a manner which causes a central portion of the roll shell to deviate from said substantially circular cylindrical shape and adapts the deviated cylindrical shape of said central portion of said roll shell to a counter surface intended to coact with the press roll;
   substantially circular cover members rotatably and sealingly journaled upon said stationary roll support;
   said roll shell having substantially cylindrical end regions which merge with said central portion of said roll shell which deviates from said substantially cylindrical shape and with said substantially cylindrical end regions being fastened to said cover members; and
   sealing means interposed between said cover members and said stationary roll support for sealing an internal space of said roll shell.

2. The press roll as defined in claim 1, further including:
   a guide surface operatively correlated with the support surface at least at one side thereof; and
   said guide surface having a convex profile provided with at least one radius which is essentially equal to the radius of the inner surface of the roll shell when assuming its cylindrical shape.

3. The press roll as defined in claim 1, further including:
   a guide surface operatively correlated with the support surface at least at one side thereof; and
   said guide surface having a convex profile provided with at least one radius which is smaller than the radius of the inner surface of the roll shell when assuming its cylindrical shape.

4. The press roll as defined in claims 2 or 3, further including:
   pressure lubricant infeed means provided for at least said guide surface.

5. The press roll as defined in claims 2 or 3, further including:
   hydrostatic bearing pocket means for a hydrostatic lubricant provided for said guide surface.

6. The press roll as defined in claim 1, further including:
   pressure lubricant infeed means provided for at least the support surface.

7. The press roll as defined in claim 6, further including:
   at least two rows of hydrostatic bearing pockets; and
   special supply line means connected with said two rows of hydrostatic bearing pockets.

8. The press roll as defined in claim 6, further including:
   at least two rows of support elements; and
   special supply line means connected with said at least two rows of support elements.

9. The press roll as defined in claim 1, wherein:
   said support surface is formed at least at one support element; and
   a hydrostatic support arrangement for supporting the support element upon the roll support in the manner of a piston-and-cylinder unit.

10. The press roll as defined in claim 9, further including:
    hydrostatic bearing pocket means;
    said hydrostatic support arrangement having a pressure compartment; and
    throttle bore means for connecting the hydrostatic bearing pocket means with the pressure compartment of the hydrostatic support arrangement.

11. The press roll as defined in claim 1, wherein:
    said support surface possesses a convex shape at least at a portion of its extent in the circumferential direction of the roll shell; and
    said convex shape having a larger radius than the radius of the cylindrical shape of the inner surface of the roll shell.

12. The press roll as defined in claim 1, wherein:
    said support surface possesses a substantially flat configuration at least at a portion of its extent.

13. The press roll as defined in claim 1, wherein:
    said support surface possesses a concave configuration in the circumferential direction of the roll shell; and
    said support surface having a shape which is accommodated to the radius of a counter roll coacting with the press roll and to the thickness of a pressed web material located between the counter roll and the support surface and the roll shell.

14. The press roll as defined in claim 1, further including:
    hydrostatic bearing pocket means for a hydrostatic lubricant provided for the support surface.

15. The press roll as defined in claim 1, wherein:
    said support surface is formed at said roll support.

16. The press roll as defined in claim 1, wherein:
    said roll shell has an inner compartment;
    means for sealing in essentially gas-tight fashion the inner compartment of said roll shell; and
    an infeed line for compressed air with which there is connected said inner compartment of said roll shell.

17. A press roll for forming an extended nip, comprising:
    a roll shell made of easily deformable material and having end portions, a central portion and an inner surface;
    said end portions and said central portion being of substantially cylindrical shape;
    said roll shell defining a circumferential direction of the press roll;
    a support surface for supporting said roll shell at said inner surface at the region of said central portion;
    a stationary roll support for supporting said support surface;
    substantially circular cover members mounted at said roll shell and journaled at said stationary roll support for rotatably supporting said roll shell at said end portions and for maintaining said substantially cylindrical shape of said end portions of said roll shell substantially circularly cylindrical during operation of the press roll;
    said central portion moving along said support surface in said circumferential direction of the press roll;
    said support surface having a shape which deviates from said substantially cylindrical shape of said central portion of said roll shell in said circumferential direction in a manner which causes said central portion of said roll shell to deviate from said substantially cylindrical shape and adapts the deviated cylindrical shape of said central portion of said roll shell to a counter surface intended to coact with the press roll; and
    said roll shell formed of said easily deformable material containing a transition region which unites said substantially circularly cylindrical shape of said end portions of said roll shell maintained substantially circular by said cover members with said deviated cylindrical shape of said central portion of said roll shell adapted to said counter surface by said shape of said support surface.

* * * * *

UNITED STATES PATENT AND TRADEMARK OFFICE
CERTIFICATE OF CORRECTION

PATENT NO. : 4,570,314
DATED : February 18, 1986
INVENTOR(S) : HERBERT HOLIK et al.

It is certified that error appears in the above—identified patent and that said Letters Patent is hereby corrected as shown below:

Column 1, line 36, please delete "should be"

Column 1, line 37, after "surface" please insert —should be—

Column 7, line 9, after "which" please delete "or" (second occurrance) and insert —for—

Signed and Sealed this

Twenty-second Day of July 1986

[SEAL]

Attest:

DONALD J. QUIGG

Attesting Officer

Commissioner of Patents and Trademarks